US012336957B2

United States Patent
Li et al.

(10) Patent No.: US 12,336,957 B2
(45) Date of Patent: Jun. 24, 2025

(54) PORTABLE AUTOMATED CHEST-ABDOMINAL COMPRESSION DEVICE USED IN CONFINED SPACES AND MANIPULATION METHOD THEREOF

(71) Applicant: SHANDONG UNIVERSITY, Shandong (CN)

(72) Inventors: Ke Li, Shandong (CN); Mingze Sun, Shandong (CN); Yuguo Chen, Shandong (CN); Feng Xu, Shandong (CN); Jiali Wang, Shandong (CN); Chang Pan, Shandong (CN); Jiaojiao Pang, Shandong (CN); Yuan Bian, Shandong (CN); Yibin Li, Shandong (CN); Ruixuan Zhang, Shandong (CN)

(73) Assignee: SHANDONG UNIVERSITY, Shandong (CN)

( * ) Notice: Subject to any disclaimer, the term of this patent is extended or adjusted under 35 U.S.C. 154(b) by 0 days.

(21) Appl. No.: 18/940,709

(22) Filed: Nov. 7, 2024

(65) Prior Publication Data

US 2025/0057724 A1    Feb. 20, 2025

Related U.S. Application Data

(63) Continuation of application No. PCT/CN2024/089134, filed on Apr. 22, 2024.

(30) Foreign Application Priority Data

Apr. 23, 2023  (CN) .......................... 202310467480.1

(51) Int. Cl.
*A61H 31/00*        (2006.01)
(52) U.S. Cl.
CPC ... *A61H 31/006* (2013.01); *A61H 2201/1215* (2013.01); *A61H 2201/1669* (2013.01);
(Continued)

(58) Field of Classification Search
CPC .... A61H 31/00; A61H 31/004; A61H 31/006; A61H 31/005
See application file for complete search history.

(56) References Cited

U.S. PATENT DOCUMENTS

| 2006/0047228 | A1* | 3/2006 | Petelenz | A61H 31/007 |
| | | | | 601/44 |
| 2007/0060785 | A1* | 3/2007 | Freeman | A61H 31/00 |
| | | | | 600/16 |

(Continued)

FOREIGN PATENT DOCUMENTS

| CN | 105764468 | 7/2016 |
| CN | 209900033 | 1/2020 |

(Continued)

OTHER PUBLICATIONS

Sebastian et al., "Closed-loop machine-controlled CPR system optimises haemodynamics during prolonged CPR," Resuscitation Plus, 2020 (Year: 2020).*

(Continued)

*Primary Examiner* — Victoria Murphy
*Assistant Examiner* — Savannah L Gabriel
(74) *Attorney, Agent, or Firm* — JCIPRNET (57) ABSTRACT

Provided is a portable automated chest-abdominal compression (CC-AC) device used in confined spaces and a manipulation method thereof, comprising: a compression mechanism having a strap fixing module, a compression plate connected to the strap fixing module and a compression piston arranged on one side of the compression plate; a detection module having a displacement sensor and a pressure sensor; a control module receiving compression depth and pressure, and obtaining a compensation value of time of a single compression according to the compression depth and a target depth, thereby controlling an action of a driving mechanism during the CC process; constructing an abdomi- (Continued)

nal mechanics model according to the compression depth and pressure, and compensating the compression depth according to the target pressure by using the abdominal mechanics model, thereby controlling the action of the driving mechanism during the AC process.

8 Claims, 4 Drawing Sheets

(52) U.S. Cl.
CPC ............... *A61H 2201/5007* (2013.01); *A61H 2201/5056* (2013.01); *A61H 2201/5064* (2013.01)

(56) References Cited

U.S. PATENT DOCUMENTS

| | | | | |
|---|---|---|---|---|
| 2011/0092864 | A1* | 4/2011 | Woerlee | A61H 31/00 601/41 |
| 2014/0052032 | A1* | 2/2014 | Freeman | A61N 1/39044 601/41 |
| 2017/0156977 | A1* | 6/2017 | Walden | A61H 31/006 |
| 2019/0175443 | A1* | 6/2019 | Härdig | A61H 31/005 |

FOREIGN PATENT DOCUMENTS

| | | |
|---|---|---|
| CN | 114533523 | 5/2022 |
| CN | 114886758 | 8/2022 |
| CN | 116370291 | 7/2023 |
| KR | 102489017 | 1/2023 |
| WO | 2020116898 | 6/2020 |
| WO | 2022005897 | 1/2022 |

OTHER PUBLICATIONS

Babbs, "CPR Techniques That Combine Chest and Abdominal Compression and Decompression: Hemodynamic Insights From a Spreadsheet Model" 1999 (Year: 1999).*

"International Search Report (Form PCT/ISA/210) of PCT/CN2024/089134," mailed on Jul. 23, 2024, with English translation thereof, pp. 1-10.

"Written Opinion of the International Searching Authority (Form PCT/ISA/237) of PCT/CN2024/089134," mailed on Jul. 23, 2024, with English translation thereof, pp. 1-11.

* cited by examiner

PORTABLE AUTOMATED CHEST-ABDOMINAL COMPRESSION DEVICE USED IN CONFINED SPACES AND MANIPULATION METHOD THEREOF

CROSS-REFERENCE TO RELATED APPLICATION

This application is a continuation of international PCT application serial no. PCT/CN2024/089134, filed on Apr. 22, 2024, which claims the priority benefit of China application no. 202310467480.1, filed on Apr. 23, 2023. The entirety of each of the above-mentioned patent applications is hereby incorporated by reference herein and made a part of this specification.

TECHNICAL FIELD

The present invention relates to the technical field of cardiopulmonary resuscitation apparatus, in particular to a portable automated chest-abdominal compression device used in confined spaces and a manipulation method thereof.

DESCRIPTION OF RELATED ART

The statements in this section merely provide background technical information related to the present invention and do not necessarily constitute prior art.

In special trapped environment such as confined and claustrophobic spaces, when a trapped person has cardiac arrest, the physical and psychological pressure of the trapped person is easily aggravated due to the obstruction of material communication and information communication between the trapped person and the outside world, thus threatening the safety of the trapped person and increasing the difficulty of rescue. At the same time, due to the confined space, lack of materials and negative emotions such as panic and anxiety caused by the claustrophobic space, the mental stress of the trapped person is huge, which is easy to cause secondary injury to the trapped person.

In the trapped environment, it is very difficult to require rescuers to implement continuous and accurate cardiopulmonary resuscitation (CPR) measures or timely and accurate self-rescue measures for the trapped person(s), and the conventional CPR measures require rescuers to implement standardized CPR for a long time, which has high requirements for the spirit and physical fitness of the rescuers or the self-rescuers. Under special circumstances, effective rescue measures are often unable to be carried out, thus causing unnecessary personal injuries.

Meanwhile, the CPR requires high physical fitness for the rescuers or the self-rescuers. In the process of long-time CPR, the chest compression (CC) depth and frequency are generally not guaranteed, which is easy to cause secondary symptoms such as fracture and soft tissue contusion, or, miss the best treatment timing due to a non-standard CC.

Therefore, the standard and long-time CPR can be performed in confined spaces by using automated CPR equipment. However, the currently used automated CPR equipment is large both in size and in mass and inconvenient to carry, so it is not easy to be placed and operated in a special trapped space; the conventional automated CPR equipment is based on electric and pneumatic principles, and requires air source and large battery to provide power during operating, further increasing the difficulty of use; a conventional strap structure concentrates the weight of the whole compression mechanism on the chest and abdomen of the patient, thus causing unnecessary compression to the patient, which is detrimental to the blood circulation of the patient.

In addition, under the condition that the chest or upper limbs of the trapped person are injured, the conventional CC cannot be carried out, and the conventional CC device is not convenient to be directly used for the abdominal compression (AC), which is not conducive to the normal treatment to the patient; moreover, due to the large difference in the abdominal characteristics between patients, the fixed compression depth or fixed compression pressure cannot fit the continuous AC of the different patients.

SUMMARY

In order to solve the above problems, the present invention provides a portable automated chest-abdominal compression (CC-AC) device used in confined spaces and a manipulation method thereof, introducing an AC based on force feedback on the premise of satisfying CC in function, proposing a separate design of a compression mechanism and a control module in volume, having the automated CPR function while being small in size and light in weight, and being convenient to be placed and operated in the confined spaces.

To achieve the above object, the present invention adopts the following technical solutions.

In a first aspect, the present invention provides a portable automated CC-AC device used in confined spaces, comprising a compression mechanism, a driving mechanism, a detection module and a control module.

The compression mechanism comprises a strap fixing module, a compression plate connected to the strap fixing module and a compression piston arranged on one side of the compression plate.

The driving mechanism is configured to perform an action for driving the compression piston.

The detection module comprises a displacement sensor arranged on the compression piston and a pressure sensor arranged on another side of the compression plate, and is configured to detect a compression depth and a compression pressure, respectively.

The control module receives the detected compression depth and the detected compression pressure, and is configured:

to obtain a compensation value of time of a single compression according to the received compression depth and a target depth, to control an action of the driving mechanism during a CC process; and to construct an abdominal mechanics model according to the received compression depth and pressure, and compensate the received compression depth according to the target pressure by using the abdominal mechanics model, to control an action of the driving mechanism during an AC process.

As an alternative implementation, the strap fixing module comprises a first bottom plate, a second bottom plate, straps, and springs, wherein the first bottom plate and the second bottom plate are connected through a buckle, the straps and the springs are connected to one side of the first bottom plate and one side of the second bottom plate that are opposite to each other, and the springs are arranged at two sides of the straps.

As an alternative implementation, the compression mechanism is connected to the control module and a power supply through cables, and is designed separately from the power supply and the control module.

As an alternative implementation, the compensation value of the time of the single compression is obtained according to a depth error that is obtained according to the compression depth and the target depth, and a formula thereof is as follows:

$$\Delta t(k) = K_P\left[(e_{dx}(k) - e_{dx}(k-1)) + \frac{1}{K_I}e_{dx}(k) + K_D(e_{dx}(k) - 2e_{dx}(k-1) + e_{dx}(k-2))\right]$$

wherein, $K_P$, $K_I$, and $K_D$ are PID (Proportion Integration Differentiation) control coefficients; k is the number of compression.

As an alternative implementation, a rotational speed of the driving mechanism during the CC is controlled based on the compensation value of the time of the single compression.

As an alternative implementation, the abdominal mechanics model is:

$$F_{ab} = M_d a_q + D_d v_q + K_d d_q$$

wherein, $F_{ab}$ is the compression pressure; $M_d$, $D_d$ and $K_d$ are acceleration coefficient, velocity coefficient and depth coefficient, respectively; $d_q$ is the compression depth; $v_q$ is running speed, and $a_q$ is running acceleration.

As an alternative implementation, the acceleration coefficient, the velocity coefficient, and the depth coefficient are updated according to changes in the detected compression depth and the detected compression pressure, and the updated acceleration coefficient $M'_d$, the updated velocity coefficient $D'_d$, and the updated depth coefficient $K'_d$ respectively are:

$$K'_d = \max\left(\frac{F_{ab}}{d_q}\right);$$

$$D'_d = \frac{F_{ab} - K'_d * d_q}{d_q};$$

and $$M'_d = \frac{F_{ab} - K'_d * d_q - D'_d * v_q}{\ddot{d}_q}.$$

As an alternative implementation, the compression depth is compensated by using the abdominal mechanics model according to the error between the target pressure and the compression pressure, and a maximum compression depth during the AC process is changed by controlling the rotational speed of the driving mechanism.

In a second aspect, the present invention provides a manipulation method of the portable automated CC-AC device used in confined spaces according to the first aspect, the manipulation method comprising the following steps.

The compression plate at a designated position is arranged and fixed by the strap fixing module, and an action of compression piston is driven by the driving mechanism to perform a compression process.

The compression depth is detected by the displacement sensor arranged on the compression piston, and the compression pressure is detected by the pressure sensor arranged on another side of the compression plate.

In the CC process, the compensation value of the time of the single compression is obtained according to the obtained compression depth and the target depth, to control the action of the driving mechanism during the CC process.

In the AC process, the abdominal mechanics model is constructed according to the obtained compression depth and the obtained compression pressure. Then the compression depth is compensated according to the target pressure by using the constructed abdominal mechanics model, to control the action of the driving mechanism during the AC process.

As an alternative implementation, in the CC process, firstly, a depth error between the compression depth and the target depth is obtained. Then the compensation value of the time of the single compression is obtained according to the obtained depth error, and then the rotational speed of the driving mechanism is controlled according to the compensation value of the time of the single compression.

As an alternative implementation, in the AC process, according to the error between the target pressure and the compression pressure, the compression depth is compensated by using the abdominal mechanics model, and a maximum compression depth is changed by controlling the rotational speed of the driving mechanism during the compression process.

Compared with the prior art, the present invention has the beneficial effects that:

According to the present invention, the portable automated CC-AC device used in confined space, uses a motor to drive the compression piston complete the compression operation, adapts to physiological parameters of a patient through the straps at two sides of the compression plate, uses a spring structure to disperse the weight of the compression structure and separates the compression mechanism from the control module and the power supply, which ensures a separated operation of the compression device to be realized within a certain distance, and reduces the volume and weight of the device required to be placed under special circumstances.

According to the present invention, the portable automated CC-AC device used in confined space, introduces the AC based on force feedback, on the premise of satisfying the CC, completes the AC operation by adopting the same mechanical structure as the CC, which reduces the volume of the device; uses the PID method for completing the control of the compression depth and the compression frequency during the CC process, and uses an admittance control for completing the control of the compression pressure and the compression depth during the AC, which meets personalized AC requirements.

According to the present invention, the portable automated CC-AC device used in confined space, constructs an individualized abdominal mechanics model of a patient by taking the compression pressure as a parameter of the AC, performs the admittance control according to the abdominal mechanics model, controls the force output from the tail end of the compression piston in real-time, which can satisfy pressure stability in the AC process so as to maintain normal blood circulation of the patient.

Additional aspects of the present invention will be set forth in part in the description which follows, and in part will be obvious from the description, or may be learned by practice of the present invention.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

DESCRIPTION OF THE EMBODIMENTS

The present invention will now be further described with reference to the accompanying drawings and embodiments.

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

It should be noted that the terms used here are only for describing specific embodiments and are not intended to limit exemplary embodiments according to the present invention. As used herein, unless otherwise explicitly stated in the context, the singular form is also intended to include the plural form. Additionally, it should be understood that the terms "including" and "having", as well as any variations thereof, are intended to cover non-exclusive inclusions, such as processes, methods, systems, products, or devices that contain a series of steps or units that are not necessarily limited to those steps or units clearly listed, but may include other steps or units that are not clearly listed or inherent to these processes, methods, products, or devices.

The embodiments and the features of the embodiments in the present invention may be combined with each other without conflict.

Embodiment 1

The present embodiment provides a portable automated CC-AC device used in confined spaces, comprising a compression mechanism, a driving mechanism, a detection module and a control module; wherein, the compression mechanism comprises a strap fixing module, a compression plate connected to the strap fixing module and a compression piston arranged on a first side of the compression plate;

the driving mechanism is configured to perform an action for driving the compression piston;

the detection module comprises a displacement sensor arranged on the compression piston and a pressure sensor arranged on a second side of the compression plate, which are used for detecting compression depth and pressure respectively; and the control module receives the detected compression depth and pressure, being configured to:

obtain a compensation value of time of a single compression according to the received compression depth and a target depth, thereby controlling the action of the driving mechanism during a CC process; and construct an abdominal mechanics model according to the received compression depth and pressure, and compensate the compression depth according to the target pressure by using the abdominal mechanics model, thereby controlling the action of the driving mechanism during an AC process.

Figure 1A:
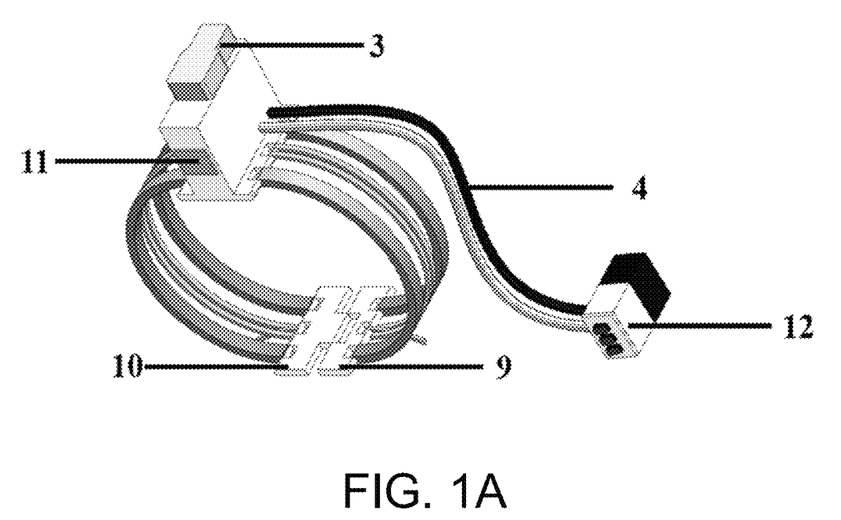
FIGS. 1A to 1C are schematic diagrams of a portable automated CC-AC device used in confined spaces provided in Embodiment 1 of the present invention.
Figure 1B:
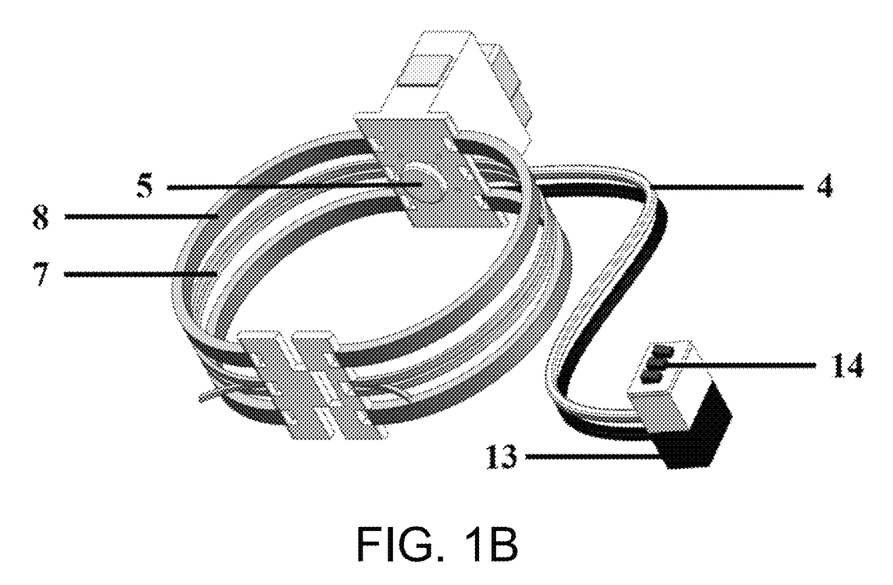
Figure 1C:
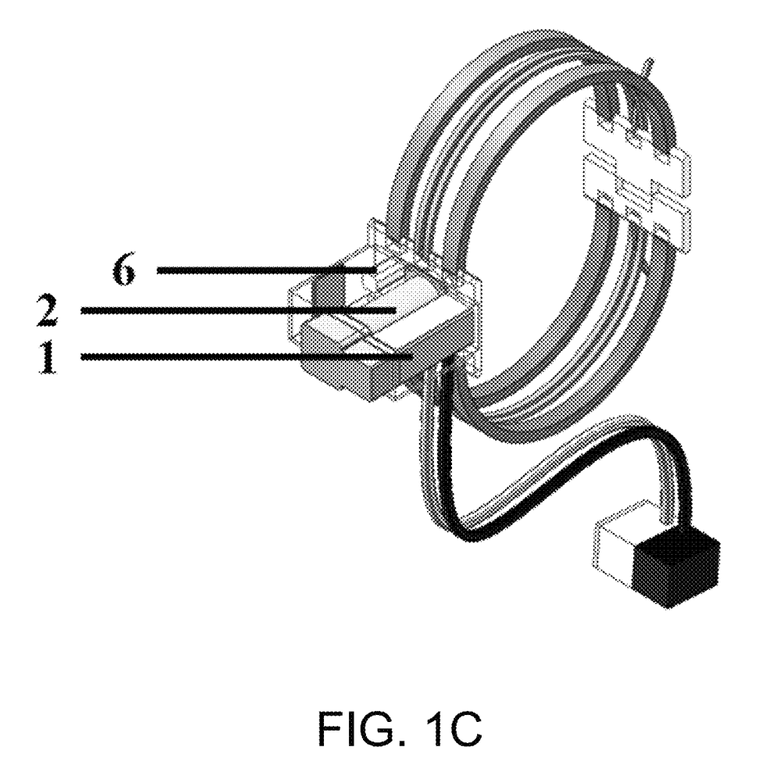

As shown in FIGS. 1A to 1C, the strap fixing module comprises a first bottom plate 9, a second bottom plate 10, straps 7, and springs 8, wherein the first bottom plate 9 and the second bottom plate 10 are connected through a buckle, the straps 7 and the springs 8 are connected to a side of the first bottom plate 9 and one side of the second bottom plate 10 that opposite to each other, and the springs 8 are arranged at two sides of the straps 7.

In the confined space and emergency disaster relief situation, due to the problems such as inconvenient transferring of wounded and limited material transporting channels, the automated CPR device used must meet the requirements of portability of small size and light weight and emergency requirements of rapid installing and placing, while the CC device with traditional support frame and support arm structure is large in size and heavy in weight, and is inconvenient to carry and use. Therefore, in the present embodiment, the size and weight are reduced by adopting a strap type structure, and the requirements of rapid installing and placing are met by adopting a detachable bottom plate structure.

In the process of using, after a patient lies flat on his back, separating the first bottom plate and the second bottom plate, placing the compression mechanism at a proper position of the chest or abdomen of the patient, connecting the first bottom plate and the second bottom plate at the back or waist of the patient through the buckle, completing the fixing by adjusting the length of the straps, wherein the length of the straps can be adjusted according to the chest and abdominal conditions of different patients so as to meet the using requirements of most people, and realizing applicability, portability, rapidity of placing and comfort to the patient in a the confined spaces.

Since the conventional strap structure concentrates the weight of the entire compression mechanism on the chest and abdomen of the patient, unnecessary compression may be caused to the patient, which is detrimental to the blood circulation of the patient. Therefore, in the present embodiment, two steel wire spring structures coated with nylon materials are added on both sides of the straps for fixing the patient, and in the process of adjusting the length of the straps and fixing by rescuer, the steel wire springs are extruded and expand outward, and the tension generated by the springs reset is sufficient to offset the gravity of the compression mechanism itself; since the material used for the straps is an inextensible braided fabric, balance among the spring tension, the gravity of the compression mechanism and the strap tension can be realized, so that the weight of the compression mechanism will not be borne by the patient during the compression process, and meanwhile, shaking due to the spring tension will not be caused, and the blood circulation and respiratory ventilation of the chest and abdominal of the patient will not be affected due to the excessive weight of the compression mechanism, thereby ensuring the stability of the position of the compression mechanism during the compression process and the applicability to different patients.

Compared with products on the market, the compression device of the present embodiment has a large degree of reduction in overall structure and weight, can be rapidly placed and used in the emergency rescue situation, and at the same time, the compression plate is used to keep the compression mechanism from shifting in the CPR process, so as to meet a using condition of the wounded transferring process.

In the present embodiment, one side of the compression plate is provided with a shell, a compression piston 2, a displacement sensor 6 and a driving mechanism 1 are arranged in the shell, a display screen 11 is arranged on an outer wall of the shell; the compression piston 2 is connected to the displacement sensor 6 and the driving mechanism 1, the displacement sensor 6 is used for recording the displacement of the piston in real-time, the driving mechanism 1 includes a direct current (DC) motor, a reduction gear set 3 is arranged on the driving mechanism 1, the compression piston is rotationally driven by the DC motor to perform the compression operation, and the compression depth and frequency are controlled by controlling the rotating speed of the DC motor; and another side of the compression plate is provided with a pressure sensor 5, and the pressure sensor 5 is used for recording the compression pressure applied by the compression piston on the chest or abdomen in real-time.

In the present embodiment, the compression mechanism is connected to the control module 12 and a power supply 13 through cables 4, the control module 12 is provided with a switch 14, the power supply 13 is a 24V power supply, the compression mechanism is separated from the power supply and the control module, and in some special cases, the compression mechanism can be controlled within a certain distance relying on the cables without moving the power supply and the control module with large weight.

In use, firstly fixing the position of the compression mechanism, and setting the compression frequency to 80-120 times/min and setting the compression depth to 3.5-6.5 cm; after the compression process starts, setting an initial compression depth to 3 cm, and the compression times to 20 times, increasing the compression depth of each compression by 0.1 cm, and setting the compression frequency to 100 times/min for a soft start, so as to prevent fracture caused by excessive initial compression depth; the parameters during normal pressing are set according to actual requirements, and theoretically, the CC depth is set to be greater than 5 cm, the AC pressure is set to be greater than 400 N, and the compression frequency is not less than 100 times/min.

Figure 2:
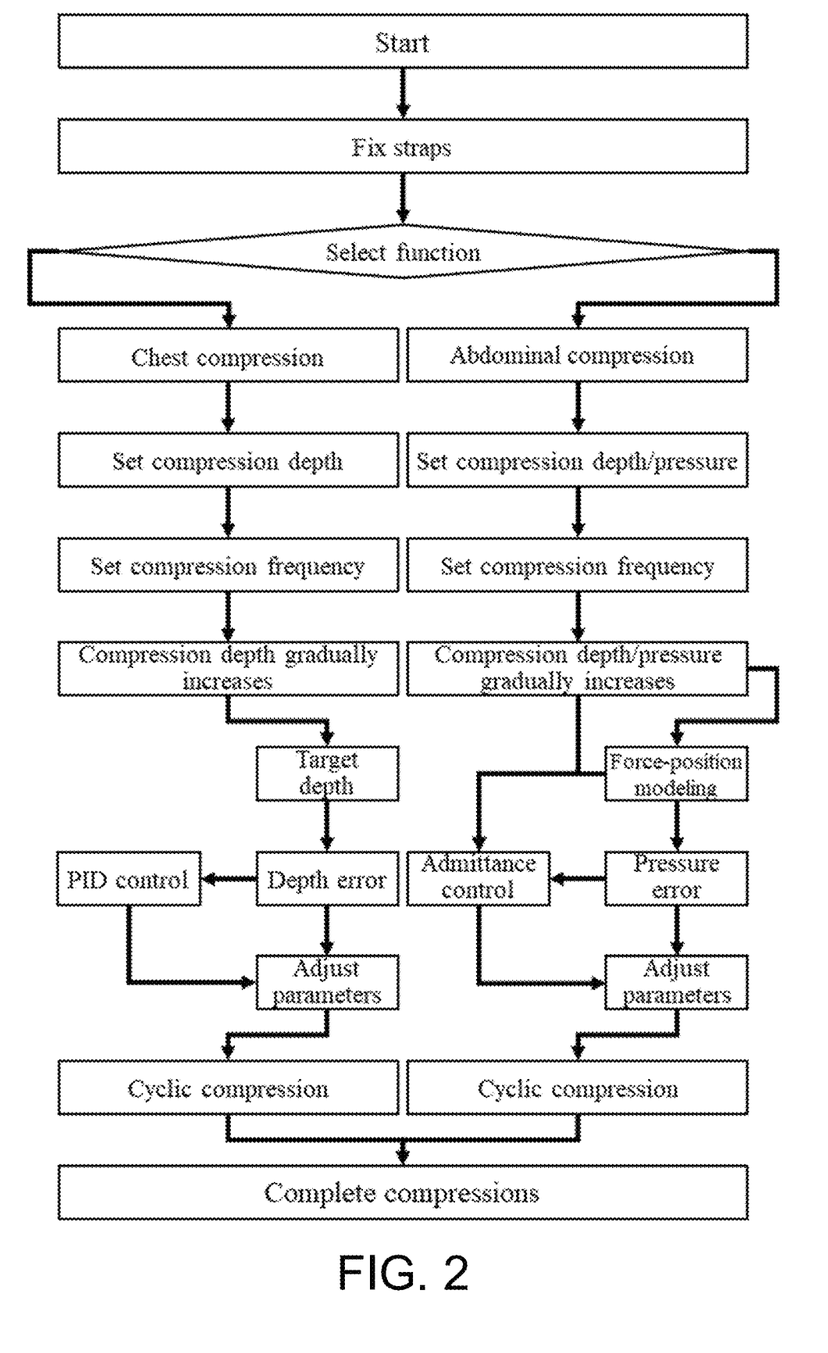
FIG. 2 is a control flow chart of the portable automated CC-AC device used in confined spaces provided in Embodiment 1 of the present invention.

In the present embodiment, as shown in FIG. 2, the CC and the AC are controlled separately, wherein, for the CC, setting compression depth and frequency, and gradually increasing the compression depth, and then utilizing a PID control according to the acquired actual compression depth and a set target compression depth to perform the adjustment of the parameters; for the AC, setting the compression depth, pressure and frequency, and gradually increasing the compression depth and pressure, and then adjusting the parameters by adopting admittance control by constructing the abdominal mechanics model and a set target compression pressure. The two manipulation methods are described in detail below.

Figure 3:
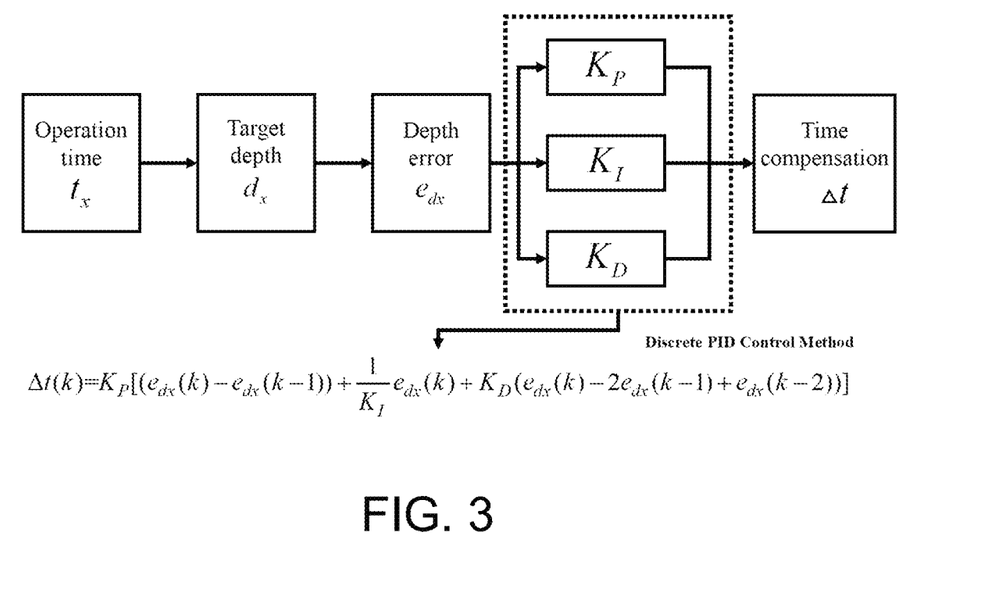
FIG. 3 is a control flow chart of the CC process according to Embodiment 1 of the present invention.

In the present embodiment, as shown in FIG. 3, when performing the CC, setting the rotational speed of the DC motor to $v_{motor}$, the target depth to $d_x$, and required time of the single compression reaching the target depth or target pressure to $t_x$, so a relationship therebetween as shown in Equation (1):

$$d_x = v_{motor} * t_x \qquad (1)$$

In the present embodiment, setting a maximum time of duration of the single compression to:

$$T_x = \frac{60 * 0.9}{2 * \text{frequency}} \qquad (2)$$

wherein, frequency is the set compression frequency, theoretically guaranteed $T_x > 1.1 * t_x$.

obtaining the depth error $e_{dx}$ according to the obtained compression depth and the target depth, obtaining the compensation value $\Delta t$ of the time of the single pressing time by adopting a discrete PID control method according to the obtained depth error, and then obtaining a rotational speed of the DC motor to be adjusted according to Equation (3) as follows:

$$\Delta t(k) = K_P \bigg[ (e_{dx}(k) - e_{dx}(k-1)) + \frac{1}{K_I} e_{dx}(k) + K_D(e_{dx}(k) - 2e_{dx}(k-1) + e_{dx}(k-2)) \bigg], \qquad (3)$$

wherein, $K_P$, $K_I$, and $K_D$ are PID control coefficients, and are constants; k is the number of compression.

Figure 4:
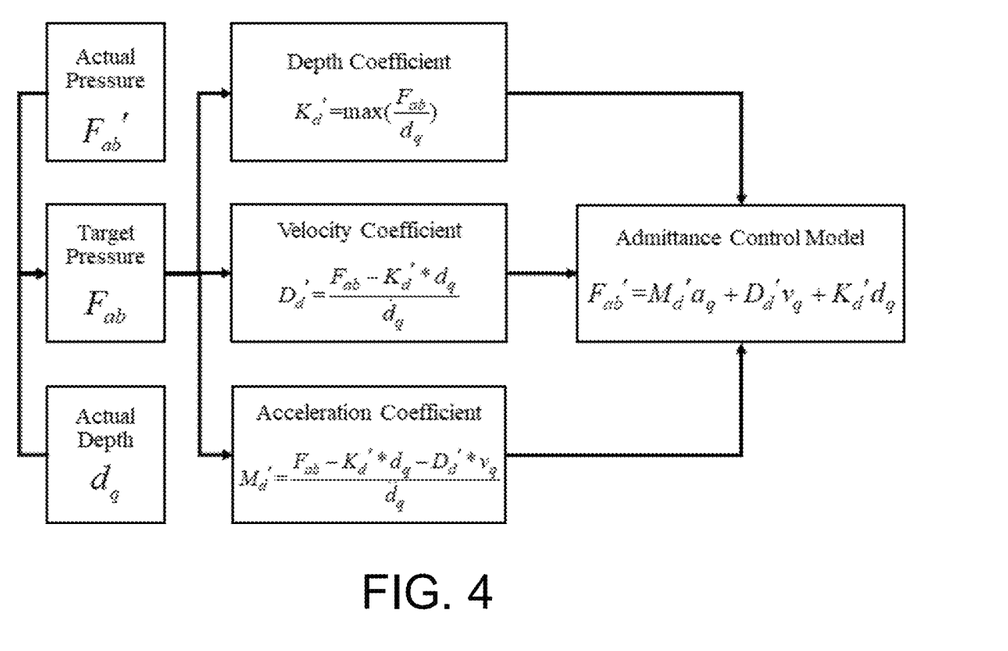
FIG. 4 is a control flow chart of the AC process according to Embodiment 1 of the present invention.

In the present embodiment, as shown in FIG. 4, when performing the AC, designing a manipulation method of the AC based on force feedback. Since the parameter setting of conventional AC is unclear, and current research has used pressure generated by compressions as an indicator, the present embodiment takes the compression pressure as the indicator of the AC, and performs the pressure control during the compression based on an admittance control method.

According to the robot kinematics equation:

$$\tau_{ext} = M_d \ddot{\tilde{q}} + D_d \dot{\tilde{q}} + K_d \tilde{q} \qquad (4)$$

wherein, $\tau_{ext}$ is actual output force; $\ddot{\tilde{q}}$ is running acceleration matrix of joint; $\dot{\tilde{q}}$ is running velocity matrix of the joint; $\tilde{q}$ is running displacement matrix of the joint; $M_d$, $D_d$, $K_d$ are constant matrices related to parameters of joint of a robot, i.e. acceleration coefficient, velocity coefficient and depth coefficient respectively.

The compression device used in the present embodiment can be approximated as a single-joint single-degree-of-freedom robot, and the dimension of the parameter matrix thereof is set as 1×1, i.e., a single variable. During the compression period, setting rotation distance of the motor to $d_q$, running speed of the motor to $v_q$, running acceleration of the motor to $a_q$, and a final compression pressure generated by the end of the compression piston to $F_{ab}$, then obtaining Equation (5) according to the admittance control principle:

$$F_{ab} = M_d a_q + D_d v_q + K_d d_q \qquad (5)$$

At this time, $M_d$, $D_d$, and $K_d$ are the relevant parameter constants of the abdominal mechanics model, which are related to the patient's abdominal condition and change slightly with the compression time.

In an initial stage of the AC process, after the compression depth and the target pressure are set, the compression depth increases gradually, and the pressure peak collected by the pressure sensor at the end of the compression piston also increases. Since the abdominal mechanics of the patient in the initial conditions are unknown, predictive modeling of the patient's abdomen is performed based on existing models:

$$F_{ab} = 120*(X_r - X) + 2*(\dot{X}_r - \dot{X}) - 2*(\ddot{X}_r - \ddot{X}) \tag{6}$$

wherein, $X_r$ is the target position, i.e., the target compression depth; X is actual position, i.e., the current compression depth; $\dot{X}_r$ is target velocity, i.e., the target movement velocity of the compression piston; $\dot{X}$ is actual velocity, i.e., the current movement velocity of the compression piston; $\ddot{X}_r$ is target acceleration, i.e., the target acceleration of movement of the compression piston; and $\ddot{X}$ is actual acceleration, i.e., the current acceleration of movement of the compression piston.

Since the measurement of the velocity and acceleration during compression requires an increase in the number of sensors, resulting in complexity of the circuit and increase in the weight of the device, the present embodiment uses displacement data as the compression depth $d_q$, and uses the differential $v_q$ of displacement data with respect to time and the second differential $a_q$ of displacement data with respect to time as input parameters to reduce the amount of calculation, which are:

$$X_r - X = d_q \tag{7}$$

$$\dot{X}_r - \dot{X} = v_q = \dot{d}_q \tag{8}$$

$$\ddot{X}_r - \ddot{X} = a_q = \ddot{d}_q \tag{9}$$

In the incremental compression process, determining a peak value of the compression pressure at the corresponding compression depth, and constructing and updating the abdominal mechanics model in real-time, so as to construct the personalized abdominal mechanics model. An updating method of the model is shown in Equations (11)-(14):

$$K'_d = \max\left(\frac{F_{ab}}{d_q}\right) \tag{11}$$

$$D'_d = \frac{F_{ab} - K'_d * d_q}{\dot{d}_q} \tag{12}$$

$$M'_d = \frac{F_{ab} - K'_d * d_q - D'_d * v_q}{\ddot{d}_q} \tag{13}$$

$$F'_{ab} = M'_d a_q + D'_d v_q + K'_d d_q \tag{14}$$

wherein, $M'_d$, $D'_d$, and $K'_d$ are the updated acceleration coefficient, velocity coefficient and depth coefficient, respectively.

Finally, according to the error between the set target pressure and the actual compression pressure, compensating the compression depth by using the abdominal mechanics model, changing the maximum compression depth during the pressing period by controlling the rotational speed of the DC motor, thus realizing the continuous and stable operation of the AC based on the force feedback.

In the case of the trapped person whose chest or upper limbs is injured, the conventional CC cannot be carried out, and the conventional CC device is not convenient to be directly used for the AC, which is not conducive to the normal treatment of the patient. Therefore, the present embodiment introduces the AC, completes the AC operation by adopting the same mechanical structure as the CC, which saves the volume of the device; meanwhile, uses the pressure sensor to collect compression pressure data, and takes the compression pressure as a parameter of AC, thus solving the problem of insufficient effect of fixing compression depth caused by different physiological conditions of patients; moreover, the present embodiment uses a strap structure to fix the compression device, and since the abdominal size is generally smaller than that of the chest, the strap can meet the size requirement of a large span while saving the volume.

Due to the large difference in abdominal characteristics of patients, compression pressure settings need to be adjusted in real-time according to conditions of different patients and personalized CPR strategies should be formulated. Therefore, in the present embodiment, a pressure sensor is arranged at the tail end of the compression piston, a personalized abdominal mechanics model for the patient is constructed through the initial compression, the admittance control is performed according to the abdominal mechanics model, and the output force of the end of the compression piston is controlled in real-time, so as to meet the pressure stability in the AC process to maintain the normal blood circulation of the patient.

Compared with existing products, the present embodiment introduces the AC in function, proposes innovative designs such as separation of the compression mechanism and the control module in volume, has automated CPR function, is small in size and light in weight, is convenient to be placed and operated in a confined space, and provides a new technical method for rescuing in the confined space and CPR treatment strategy suitable for multiple injuries.

Embodiment 2

The present embodiment provides a manipulation method of the portable automated CC-AC device for confined spaces according to Embodiment 1, comprising:
arranging the compression plate at a designated position and fixing by the strap fixing module, driving the compression piston to press by the driving mechanism;
detecting and obtaining the compression depth by the displacement sensor arranged on the compression piston and the compression pressure by the pressure sensor arranged on another side of the compression plate;
in a CC process, obtaining the compensation value of the time of the single compression according to the obtained compression depth and the target depth, to control the action of the driving mechanism during the CC process; and
in an AC process, constructing the abdominal mechanics model according to the obtained compression depth and the obtained compression pressure, then compensating the compression depth according to the target pressure by using the constructed abdominal mechanics model, to control the action of the driving mechanism during the AC process.

Wherein, in the CC process, first obtaining the depth error between the compression depth and the target depth, then obtaining the compensation value of the time of the single compression according to the obtained depth error, and then controlling the rotational speed of the driving mechanism according to the compensation value of the time of the single compression; in the AC process, according to the error between the target pressure and the compression pressure, compensating the compression depth by using the abdominal mechanics model, and changing the maximum compression depth by controlling the rotational speed of the driving mechanism during the compression process.

It can be understood that if there is a scheme/solution to use a pressing belt and a wire spring type fixing structure, it should be regarded as the same invention. If there is a scheme/solution to simply modify the material of the structure involved in this patent, it should be regarded as the same invention. If there is a scheme/solution to simply modify the appearance of the pressing equipment, it shall be regarded as the same invention. If there is a scheme/solution to simply modify the force-feedback control strategy for the AC, it should be considered the same invention. If there is a scheme/solution to simply modify the establishment/modeling of the abdominal model and its related admittance manipulation method during the AC, it should be regarded as the same invention.

Although the specific embodiments of the present invention are described above in combination with the accompanying drawings, it is not a limitation on the protection scope of the present invention. Those skilled in the art should understand that on the basis of the technical scheme of the present invention, various modifications or deformations that can be made by those skilled in the art without creative labor are still within the protection scope of the present invention.

The above disclosed are only preferred embodiments of the invention and not intended to limit the scope of the invention. Therefore, equivalent changes made in accordance with the claims of the invention shall remain within the scope of the invention.

What is claimed is:

1. A portable automated chest-abdominal compression (CC-AC) device used in confined spaces, comprising: a compression mechanism, a driving mechanism, a detection module and a control module,
   wherein the compression mechanism comprises a strap fixing module, a compression plate connected to the strap fixing module, and a compression piston arranged on one side of the compression plate,
   wherein the driving mechanism is configured to perform an action for driving the compression piston,
   wherein the detection module comprises a displacement sensor arranged on the compression piston, and a pressure sensor arranged on another side of the compression plate, the detection module is configured to respectively detect a compression depth and a compression pressure,
   wherein the control module receives the detected compression depth and the detected compression pressure, and is configured to:
   obtain a compensation value of time of a single compression according to the received compression depth and a target depth, to control an action of the driving mechanism during a chest compression (CC) process; and
   construct an abdominal mechanics model according to the received compression depth and the received compression pressure, and compensate the received compression depth according to a target pressure by using the abdominal mechanics model, to control an action of the driving mechanism during an abdomen compression (AC) process.

2. The portable automated CC-AC device used in the confined spaces according to claim 1, wherein the strap fixing module comprises a first bottom plate, a second bottom plate, straps, and springs, wherein the first bottom plate and the second bottom plate are connected through a buckle, the straps and the springs are connected to one side of the first bottom plate and one side of the second bottom plate that are opposite to each other, and the springs are arranged at two sides of the straps.

3. The portable automated CC-AC device used in the confined spaces according to claim 1, wherein the compression mechanism is connected to the control module and a power supply through cables, and is designed separately from the power supply and the control module.

4. The portable automated CC-AC device used in the confined spaces according to claim 1, wherein the compensation value $\Delta_t$ of the time of the single compression that is obtained according to a depth error $e_{dx}$ obtained according to the received compression depth and the target depth, is:

$$\Delta t(k) = K_P\left[(e_{dx}(k) - e_{dx}(k-1)) + \frac{1}{K_I}e_{dx}(k) + K_D(e_{dx}(k) - 2e_{dx}(k-1) + e_{dx}(k-2))\right];$$

wherein $K_P$, $K_I$, and $K_D$ are PID (Proportion Integration Differentiation) control coefficients, and k is the number of compressions.

5. The portable automated CC-AC device used in the confined spaces according to claim 4, wherein a rotational speed of the driving mechanism during the CC process is controlled based on the compensation value of the time of the single compression.

6. The portable automated CC-AC device used in the confined spaces according to claim 1, wherein the abdominal mechanics model is:

$$F_{ab} = M_d a_q + D_d v_q + K_d d_q;$$

wherein $F_{ab}$ is the compression pressure, $M_d$, $D_d$ and $K_d$ are acceleration coefficient, velocity coefficient and depth coefficient, respectively, $d_q$ is the compression depth, $v_q$ is running speed, and $a_q$ is running acceleration.

7. The portable automated CC-AC device used in the confined spaces according to claim 6, wherein updating the acceleration coefficient, the velocity coefficient and the depth coefficient are updated according to changes in the received compression depth and the received compression pressure, and the updated acceleration coefficient $M'_d$, the updated velocity coefficient $D'_d$, and the updated depth coefficient $K'_d$, respectively are:

$$K'_d = \max\left(\frac{F_{ab}}{d_q}\right),$$

$$D'_d = \frac{F_{ab} - K'_d * d_q}{\dot{d}_q},$$

-continued and $$M'_d = \frac{F_{ab} - K'_d * d_q - D'_d * v_q}{\ddot{d}_q}.$$

8. The portable automated CC-AC device used in the confined spaces according to claim 6, wherein the compression depth is compensated by using the abdominal mechanics model according to an error between the target pressure and the received compression pressure, and a maximum compression depth during the AC process is changed by controlling the rotational speed of the driving mechanism.

* * * * *